United States Patent [19]

Long

[11] Patent Number: 4,717,970

[45] Date of Patent: Jan. 5, 1988

[54] VIDEO SYSTEM WITH PROGRAMMABLE VCR

[75] Inventor: Michael E. Long, Western Springs, Ill.

[73] Assignee: Zenith Electronics Corporation, Glenview, Ill.

[21] Appl. No.: 9,650

[22] Filed: Jan. 28, 1987

Related U.S. Application Data

[63] Continuation of Ser. No. 622,929, Jun. 21, 1984, abandoned.

[51] Int. Cl.⁴ .............................................. H04N 5/76
[52] U.S. Cl. .................................. 358/335; 358/191.1;
 358/194.1; 358/86; 360/29; 360/33.1; 455/6
[58] Field of Search .................. 358/335, 191.1, 194.1,
 358/86; 360/29, 33.1; 455/3, 6, 286, 133, 140,
 344, 353, 151

[56] References Cited

U.S. PATENT DOCUMENTS

| | | | |
|---|---|---|---|
| 4,031,548 | 6/1977 | Kato et al. | 360/33.1 |
| 4,267,563 | 5/1981 | Sato et al. | 358/335 |
| 4,272,791 | 6/1981 | Rifken | 360/33.1 |
| 4,316,217 | 2/1982 | Rifken | 358/86 |

*Primary Examiner*—Robert L. Richardson

[57] ABSTRACT

A video system includes a VCR coupled to the output of a summation circuit that has two inputs. The first input is supplied from an active splitter and the second from a UHF modulator/upconverter which has its input connected to the active splitter through a decoder/converter. The output of the summation circuit is coupled through a passive splitter to the VCR and the VCR is connected to the TV receiver in normal fashion. The arrangement permits full use of the VCR capabilities.

10 Claims, 1 Drawing Figure

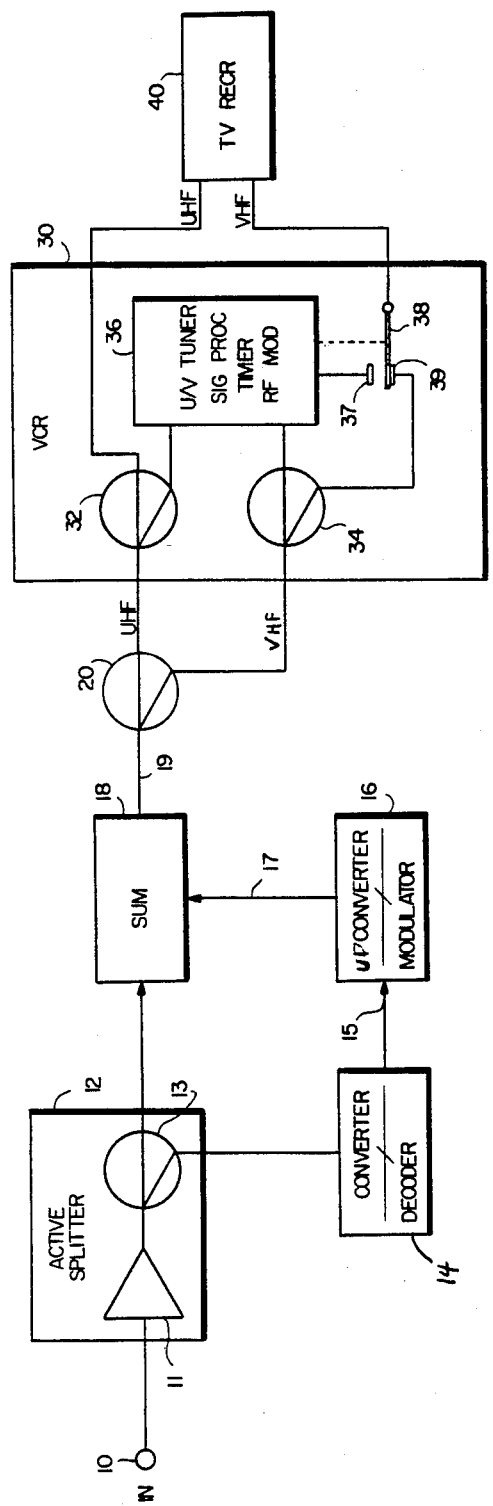

VIDEO SYSTEM WITH PROGRAMMABLE VCR

REFERENCE TO PARENT APPLICATION

This application is a continuation of application Ser. No. 622,929 filed June 21, 1984 and now abandoned.

FIELD OF THE INVENTION

This invention relates generally to video systems and particularly to video systems including video cassette recorders (VCRs).

BACKGROUND OF THE INVENTION AND PRIOR ART

A modern television receiver is used for much more than receiving broadcast signals. For example, a television receiver is often used as an audio and video display with peripheral equipment such as VCRs, video games, home computers and video disk players. Some equipment, such as the VCR, includes a full complement of functions. A VCR includes a UHF/VHF television tuner which enables it to receive both UHF and VHF television channel frequencies and has internal radio frequency (RF) switches to permit recording of one channel frequency signal while viewing another on a television receiver. The VCR also has a signal modulator for taking its recorded information from tape and modulating it onto a particular channel frequency, generally that corresponding to VHF channels 3 or 4, for viewing on the television receiver. Most VCRs also incorporate a timer that may be set or programmed to record different channels at different times. The limits on recording capability are determined by the length of recording tape available and, indeed some VCRs have a "magazine" system for automatically changing tapes. Thus the possibilities of the VCR for so-called "time shifting" purposes, that is for recording programs for viewing at a later, more convenient time, are almost limitless.

Equally important in the field of video information dissemination, has been the rise of cable systems. In these systems a subscriber is supplied, by means of a cable, with a very large number of television channels including one or more "pay" channels that are scrambled and viewable with a decoder obtained by paying an additional prescribed fee. Unfortunately these developments have tended to negate many of the features of the VCR.

In a conventional installation, the VCR is connected to the output of the cable converter/decoder. The single output of the converter/decoder is a modulated RF carrier corresponding to channel ¾. Therefore the tuning capability of the VCR is useless since the output of the converter/decoder corresponds to a single television channel frequency. Additionally the VCR feature of being able to record one program while watching another is lost. Similar problems exist when special over-the-air television signal descramblers are used with VCRs and non-cable-connected television receivers. This problem has given rise to a number of solutions to enable a VCR to record a pay TV channel, for example, while the subscriber is viewing a conventional channel. All of these solutions require a number of RF switches which must be manually operated to provide the proper signal paths. However since manual switching is required, these solutions still limit the capabilities of the VCR to automatically record different programs (channels) at different times of the day. Needless to say, the complexity involved in correctly arranging the various switches has proven extremely burdensome, if not impossible, for many users. Accordingly, there is a need in the art for a simple system that will enable a VCR to be fully used in any cable system or in an over-the-air system employing a decoder.

OBJECTS OF THE INVENTION

Accordingly, a principal object of the invention is to provide an improved video system employing a VCR.

Another object of the invention is to provide a video system having a VCR in which any channel may be viewed while recording any other channel, automatically.

SUMMARY OF THE INVENTION

In accordance with the invention, a video system comprises a VCR having television signal input terminals, signal translation means for receiving one or more television signals and supplying a single television signal output, summation means for receiving multiple inputs of different television signals including the single television signal output and for supplying all of the received signals to a common output terminal; means for supplying a plurality of television signals to the signal translation means and to the summation means and means coupling the common output terminal of the summation means to the VCR.

BRIEF DESCRIPTION OF THE DRAWING

Further objects and advantages of the invention will be apparent upon reading the following description in conjunction with the drawing, the single FIGURE of which illustrates a block diagram showing the arrangement of the invention.

DESCRIPTION OF THE PREFERRED EMBODIMENT

Referring to the drawing, an input terminal 10 is coupled to an active splitter 12 which includes an amplifier circuit 11 and a conventional television signal splitter 13. The active splitter provides two output sources of all received television signals from a single input source with minimum loss of signal strength and with minimal cross-talk or interference. Such circuits are conventional in the art, as are all of the separate elements used in the invention. A passive splitter may be used in place of the active splitter with correspondingly diminished signal strength. Active splitter 13 has two outputs, one of which is supplied to a converter/decoder 14, the output of which is supplied over a line 15 to an upconverter/modulator 16 having a single output 17. The other output of active splitter 13 is applied, along with the output of upconverter/modulator 16, to a summation circuit 18 where the two outputs are combined.

Converter/decoder 14 may be a conventional cable TV converter, with or without a special decoder for pay TV channels, or it may comprise a special decoder for over-the-air broadcast pay TV signals. For brevity it may be simply referred to as conversion means 14. In some instances, the signals appearing on line 15 will be a television signal at channel ¾ frequencies. With come decoders (such as the Zenith Electronics Corporation Z-TAC decoder), the signal appearing on line 15 will be baseband audio and video and may be separately controllable as to level. Upconverter/modulator 16 may also be of conventional construction. If an upconverter is used, it will take the channel ¾ output and shift its frequency to a different channel frequency, preferably in the UHF spectrum. If a modulator is used, it will take the baseband input signal supplied to it from conversion means 14 and modulate it onto an RF carrier corresponding to a particular channel, preferably in the UHF spectrum. In practice, upconverter/modulator 16 may include means for providing a shifted carrier television signal at any of a plurality of different UHF channel frequencies to eneable use of a UHF carrier that is not available in the local area. Here again for simplicity upconverter/modulator 16 may be referred to as frequency shifting means 16.

It will be appreciated that the choice of converter/decoder and upconverter/modulator is solely dependent upon the needs of the system environment. The invention broadly envisions the use of signal translation means for taking one of a plurality of television signals at its input and producing a single television signal at a single output that is at a channel frequency different from any of the channel frequencies associated with the plurality of television signals. Use of a converter with a channel ¾ output will dictate an upconverter for shifting the channel ¾ signal to a different channel frequency. Similarly if a decoder with a baseband signal output is used, a modulator will be needed to supply a channel carrier modulated with the baseband signal.

Summation circuit 18 provides a common output 19 that supplies a conventional VHF/UHF band splitter 20 having a pair of outputs, both of which are applied to a programmable VCR 30. One output is supplied to the UHF signal input of the VCR internal signal splitter 32 and the other output is supplied to the VHF signal input of the VCR internal signal splitter 34. One output of each splitter is supplied to a "tuner" 36. As is conventional, "tuner" 36 includes a U/V tuner, signal processing circuits, an RF modulator and a timer. The other output of internal splitter 32 is supplied directly to the UHF input of a TV receiver 40 and the other output of internal splitter 34 is supplied to a contact 39 of a switch having a common element 38 controlled by "tuner" 36 and connected to the VHF input of TV receiver 40. Contact 37 is supplied with the RF modulator output of "tuner" 36 in the VCR. Operation of the VCR closes contacts 37 and 38 to supply the television receiver with the output of the VCR on channels ¾. Under normal conditions, with the VCR off, contacts 38 and 39 are closed to enable the TV receiver to receive UHF signal channels from one output of splitter 32 and VHF channels from the output of splitter 34 by way of the switch contacts.

This VCR arrangement is in all respects conventional, with the timer being programmable to tune the U/V tuner in "tuner" 36 to receive any of the plurality of television signals available to it and for any desired time, subject to the limitations of the timer and supply of tape.

The common output 19 of summation circuit 18 will be seen to include all of the television signals appearing at input terminal 10 in addition to the different channel frequency signal from frequency shifting means 16. This latter signal is either the upconverted channel ¾ signal output of conversion means 14 or the remodulated baseband signal output of conversion means 14. Consequently, the VCR has available to it all of the signal channels, including the converted/decoded TV signal from conversion means 14. Thus the timer and programming capabilities of the VCR may be fully utilized and the VCT tuner may be switched manually or automatically among all of the different channels including a descrambled pay TV channel while maintaining the ability to view any other channel on the TV receiver. This has been accomplished without the use of any manual switches or, indeed, any switches other than the one internal to the VCR. Therefore the invention provides a very simple, efficient and cost effective video system that enables full use of the capabilities of the VCR tuner and timer in a cable/pay TV environment, with or without a channel converter or decoder, and in an over-the-air environment with a pay TV decoder.

It is recognized that numerous modifications and changes in the described embodiment of the invention will be apparent to those skilled in the art without departing from the true spirit and scope thereof. The invention is to be limited only as defined in the claims.

What is claimed is:

1. A video system comprising:
   a VCR having television signal input terminals;
   decoder means for receiving one or more television signals and for supplying a single television signal output at base band frequency;
   modulation means for modulating said single television signal on a carrier corresponding to an unused UHF channel frequency;
   summation means for receiving multiple inputs of different television signals including said unused UHF channel frequency and for supplying all of the received signals to a common output terminal;
   means for supplying a plurality of television signals to said signal translation means and to said summation means; and
   means coupling said common output terminal of said summation means to said VCR.

2. The system of claim 1 wherein said supplying means includes an active splitter.

3. The system of claim 2 further including;
   a splitter between said common output terminal of said summation means and said television signal input terminals of said VCR; and
   a television receiver having UHF and VHF television signal inputs, said television signal inputs of said VCR being a UHF input and a VHF input, respectively, the UHF input of said television receiver being connected to the UHF input of said VCR and the VHF input of said television receiver being coupled to the VHF input of said VCR under control of said VCR.

4. A video system including an input terminal supplied with a plurality of television signals;
   an active splitter coupled to said input terminal for providing two outputs, each including all of said plurality of television signals;
   decoder means coupled to one of the outputs of said active splitter for selecting one of said plurality of television signals and for generating a base band television signal therefrom;
   a UHF modulator for modulating an unused UHF channel frequency with said base band television signal to produce a UHF remodulated signal;
   a summation circuit having two inputs, one input coupled to the other output of said active splitter and another input coupled to said UHF modulator, and a common output including all of said plurality of television signals and the signal on said unused UHF channel;

a VCR having VHF and UHF inputs;
a signal splitter coupled between the common output of said summation circuit and said UHF and VHF inputs of said VCR; and
a television receiver coupled to said VCR.

5. The system of claim 4 wherein said VCR includes:
A U/V tuner and timer for selecting the channel frequencies and times for recording different ones of said plurality of television signals and said UHF remodulated signal; and
a pair of internal splitters, each having an input coupled to a respective output of said signal splitter and each having one output coupled to said U/V tuner in said VCR and another output supplying said TV receiver.

6. The system of claim 5 wherein said VCR includes an internal RF switch for connecting said TV receiver to receive either the single television signal output of said VCR or the full VHF television signal output from the associated one of said internal splitters.

7. A video system comprising:
a VCR having television signal input terminals;
converter means for receiving one or more television signals and for supplying a single television signal output;
summation means for receiving multiple inputs of different television signals including said single television signal output and for supplying all of the received signals to a common output terminal;
means for supplying a plurality of television signals to said converter means and to said summation means; and
means coupling said common output terminal of said summation means to said VCR, said converter means supplying said single television signal output at a channel frequency that is different from any of those of said plurality of television signals.

8. The system of claim 7, further including means for frequency shifting said single channel frequency to said different channel frequency.

9. The system of claim 8 wherein said frequency shifting means upconverts said single channel frequency to an unused UHF channel is a UHF modulator and wherein said supplying means includes an active splitter.

10. A video system including an input terminal supplied with a plurality of television signals;
an active splitter coupled to said input terminal for providing two outputs, each including all of said plurality of television signals;
converter means coupled to one of the outputs of said active splitter for selecting one of said plurality of television signals and translating it to a channel frequency different from the channel frequencies of said plurality of television signals and for providing said different channel frequency at a single output;
frequency shifting means for shifting the translated one of said plurality of television signals to an unused UHF channel frequency;
a summation circuit having two inputs, a first input coupled to the other output of said active splitter, a second input coupled to said frequency shifting means, and a single output including all of said plurality of television signals and the signal on said unused UHF channel;
a VCR having VHF and UHF inputs;
a signal splitter coupled between the single output of said summation circuit and said UHF and VHF inputs of said VCR; and
a television receiver coupled to said VCR.

* * * * *